(12) United States Patent
Keshava et al.

(10) Patent No.: US 6,801,208 B2
(45) Date of Patent: Oct. 5, 2004

(54) SYSTEM AND METHOD FOR CACHE SHARING

(75) Inventors: Jagganath Keshava, Folsom, CA (US); Vladimir Pentkovski, Folsom, CA (US); Subramaniam Maiyuran, Gold River, CA (US); Salvador Palanca, Gold River, CA (US); Hsin-Chu Tsai, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 09/750,750

(22) Filed: Dec. 27, 2000

(65) Prior Publication Data

US 2002/0116576 A1 Aug. 22, 2002

(51) Int. Cl.[7] .................................... G09G 5/36
(52) U.S. Cl. .................. 345/557; 345/541; 711/129; 711/153
(58) Field of Search ................ 345/541, 543, 345/544, 552, 557, 531, 519, 501, 582, 422; 711/118, 129, 130, 147, 153, 170–173

(56) References Cited

U.S. PATENT DOCUMENTS

| 4,785,395 A | * | 11/1988 | Keeley ..................... 711/122 |
| 5,434,989 A | | 7/1995 | Yamaguchi |
| 5,557,733 A | * | 9/1996 | Hicok et al. ................. 345/557 |
| 5,761,720 A | | 6/1998 | Krishnamurthy et al. |
| 5,860,158 A | | 1/1999 | Pai et al. |
| 5,909,704 A | | 6/1999 | Ireland |
| 5,911,149 A | | 6/1999 | Luan et al. |
| 6,038,647 A | | 3/2000 | Shimizu |
| 6,122,708 A | | 9/2000 | Faraboschi et al. |
| 6,161,166 A | | 12/2000 | Doing et al. |
| 6,173,367 B1 | | 1/2001 | Aleksic et al. |
| 6,223,255 B1 | | 4/2001 | Argade |
| 6,314,490 B1 | | 11/2001 | Morein |
| 6,366,994 B1 | * | 4/2002 | Kalyur ..................... 711/129 |
| 6,449,692 B1 | * | 9/2002 | Krueger et al. ............ 711/129 |
| 6,483,516 B1 | * | 11/2002 | Tischler ..................... 345/552 |
| 6,493,800 B1 | | 12/2002 | Blumrich |
| 6,665,775 B1 | * | 12/2003 | Maiyuran et al. .......... 711/129 |

* cited by examiner

*Primary Examiner*—Kee M. Tung
(74) *Attorney, Agent, or Firm*—Blakely, Sokoloff, Taylor & Zafman LLP

(57) ABSTRACT

A system and method for cache sharing. The system is a microprocessor comprising a processor core and a graphics engine, each coupled to a cache memory. The microprocessor also includes a driver to direct how the cache memory is shared by the processor core and the graphics engine. The method comprises receiving a memory request from a graphics application program and determining whether a cache memory that may be shared between a processor core and a cache memory is available to be shared. If the cache memory is available to be shared, a first portion of the cache memory is allocated to the processor core and a second portion of the cache memory is allocated to the graphics engine. The method and microprocessor may be included in a computing device.

25 Claims, 3 Drawing Sheets

SYSTEM AND METHOD FOR CACHE SHARING

BACKGROUND

1. Field of the Invention

The invention relates to the field of computer processors and sharing a cache between two operational entities in an integrated processor. More specifically, the invention relates to a system and method for sharing a cache memory between a graphics engine and a processor core in an integrated processor.

2. Background of the Invention

In some popular personal computer designs, a central processing unit (CPU) is coupled to a motherboard and communicates with main memory, disk drives, and other peripherals via a bus. Some personal computer systems are augmented by a graphics controller that is used to take the burden of rendering images off of the CPU. The graphics controller is often a separate add-on card that may be inserted into a slot on the motherboard. The graphics controller includes a specialized graphics engine and dedicated graphics memory that may be referred to as a frame buffer or video memory. In this design, the processor may also be augmented by one or more levels of cache memory which are dedicated to the processor. The cache memory may exist on or off of the die of the processor. In this kind of system, the CPU may access its cache memory and the main memory to process instructions, and the graphics engine may access its dedicated video memory and the main memory to render graphical images. However, in rendering graphics, the graphics engine may need to use memory in addition to the video memory. To do so, the graphics controller accesses the computer's main memory. Accessing the main memory is relatively slow as bus arbitration and relatively slower bus speed when compared to the speed inherent in accessing the dedicated video memory result in increased access time that lowers performance.

DETAILED DESCRIPTION OF THE INVENTION

The method of the present invention may be implemented as software stored in a computing device having a processor, or a combination of software with enabling hardware in the processor. The computing device may be a personal computer, personal digital assistant (PDA), cellular telephone, server, and any other devices having a processor, video display, and a graphics engine. In one embodiment, a single processor may include on a die a processor core, a graphics engine and a cache memory to be shared. The software, in the form of a driver, may coordinate the allocation of the shared cache memory between the graphics engine and the processor core.

Figure 1:
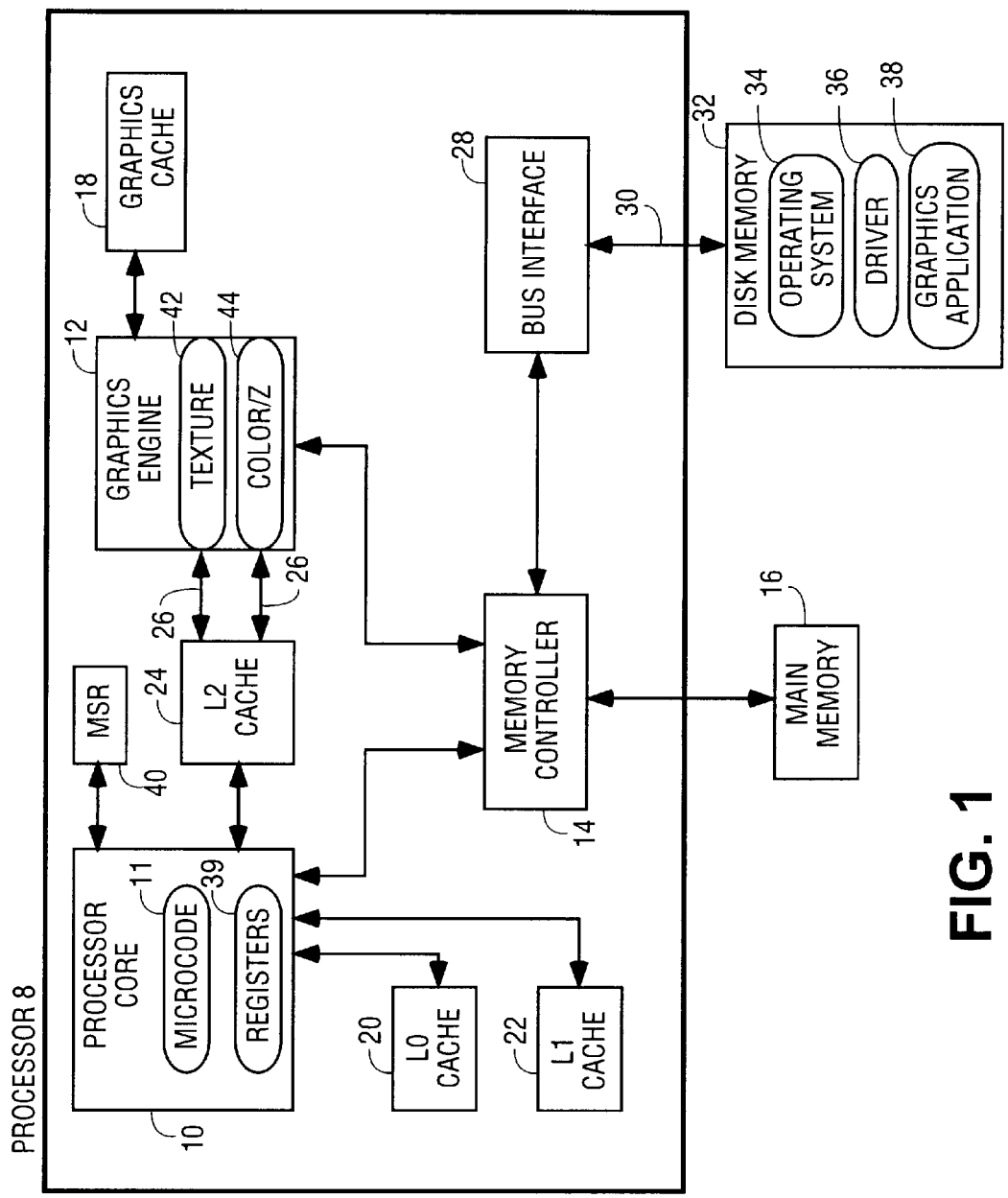
FIG. 1 illustrates an embodiment of a microprocessor architecture in which a cache memory may be shared between a processor core and a graphics engine.

FIG. 1 illustrates an embodiment of a microprocessor architecture in which a cache memory may be shared between a processor core and a graphics engine. Processor 8 includes a processor core 10, a graphics engine 12 and a memory controller 14 by which the graphics engine and the processor core access main memory 16. Processor core 10 may include a plurality of general purpose registers 39 for use in processing instructions. To provide for increased performance, in one embodiment, graphics engine 12 may include or be coupled to dedicated graphics cache memory 18. Similarly, to increase performance, in one embodiment, processor core 10 may access dedicated levels of cache, such as L0 cache memory 20 and L1 cache 22. Main memory 16, graphics memory 18, L0 cache 20 and L1 cache 22 may be any kind of random access memory (RAM). In one embodiment, main memory 16 is much larger than the cache memories. For example, the main memory may be 64 Mbytes, 128 Mbytes, etc. while the cache memories may each be 256 Kbytes, 512 Kbytes, 1 Mbyte, etc.

Various storage devices and peripherals may be coupled to processor 8 via bus 30. Bus interface 28 within processor 8 may couple bus 30 to the processor. One such storage device is disk memory 32. Disk memory 32 may be any disk storage device, including magnetic storage devices such as floppy disks and hard disks, and optical storage devices such as a compact disk reader/writer (CDRW), etc. Peripherals (not shown) may include, network access devices, such as modem or local area network (LAN) chips, chip sets, or add on cards, etc. Bus 30 may be any bus, including, for example, the Peripheral Component Interconnect (PCI) bus. Main memory 16 may be external to processor 8 and may be directly coupled to processor 8 via memory controller 14.

Processor core 10 and graphics engine 12 may each be separately coupled to L2 cache memory 24. L2 cache memory may be any RAM or other kind of memory. L2 cache memory may be any size, such as, for example, 256 Kbytes, 512 Kbytes, 1 Mbyte, 4 Mbytes, etc. In one embodiment, graphics engine 12 may include a texture processing unit 42 and a color/depth (C/Z) processing unit 44. In this embodiment, the L2 cache memory may be coupled to the graphics engine via specialized bus 26.

In one embodiment, disk memory 32 may include software such as operating system 34, driver 36, and graphics application program 38. To achieve the method of the present invention, driver 36 may be associated with graphics engine 12 upon booting up of a computer or other device that includes processor 8. This may be achieved according to well know methods in which the operating system associates the driver with the graphics engine. In other embodiments, the software, including the driver, may reside on any machine (computer) readable medium, including magnetic and optical disks; magnetic tape; read-only memory (ROM), programmable read-only memory (PROM), electronically erasable programmable memory (EEPROM), and similar semiconductor devices; or may be downloaded from any external or remote device via electrical, acoustical, or other form of propagated signal (e.g., carrier waves, digital signals, infrared signals, etc.).

Initially, upon starting up, in one embodiment, the L2 cache is exclusively allocated to the processor core. When executing graphics or video intensive applications, the driver or components of the operating system may invokes the functionality of the graphics engine to process and render images on a display device (not shown). In processing and rendering graphics, the graphics engine uses the graphics cache memory and may also access the main memory. In one embodiment, driver 36 may observe certain activity of the graphics application and/or the graphics engine that may cause the graphics engine to make memory requests of the main memory. Accessing main memory which is off-chip is relatively slow when compare to accessing cache memories which are on-chip. Therefore, when the graphics application causes the graphics engine to access memory, the performance and throughput of the processor and graphics engine may decrease. To increase the performance of the graphics engine and throughput of the processor during graphics intensive periods, the driver may deallocate or release a portion of the L2 cache from the processor core and allocate that portion to the graphics engine. In doing so, specialized bus 26, which was dormant, is activated so that the graphics engine may communicate directly with and access the L2 cache.

In one embodiment, when a portion of the L2 cache is allocated to the graphics engine, no more than half of the L2 cache may be allocated with the graphics engine. In various embodiments, various amounts of the L2 cache may be allocated to the graphics engine during graphics intensive periods, such as for example, 10%, 25%, 40%, etc. When the graphics intensive period ends, as determined by the driver, the portion of the cache allocated to the graphics engine is re-allocated to the processor core, and specialized bus 26 is de-activated. In this way, the driver allocates the L2 cache to the graphics engine dynamically, in varying amounts, and for varying periods of time.

In one embodiment, the processor core operates at one clock speed while the graphics engine operates at a second clock speed. In this embodiment, the L2 cache may operate at least two clock speeds to match the clock speeds of both the graphics engine and the processor core. In this embodiment, the L2 cache must be capable of operating at and switching between two clock speeds. More specifically, when a first portion of the L2 cache is being accessed by the processor core, it must operate at a first clock speed. It follows that the second portion of the L2 cache must switch from a first clock speed to a second clock speed to match the clock speed of the graphics engine when the second portion of the L2 cache is deallocated from the processor core and allocated to the graphics engine.

A machine specific register (MSR) 40 may also be included in processor 8. In one embodiment, the MSR is only accessibly via the processor core. To perform allocation of the L2 cache to and deallocation of the L2 cache from the graphics engine, after storing cache allocation information in one or more registers 39, the driver invokes an instruction in processor 10 to write the cache allocation information to a particular machine specific register such as MSR 40. Based on the information in the MSR, microcode 11 included with the processor core locks the processor from accessing a portion of the L2 cache specified in the MSR. In one embodiment, the processor core may conform to a 32 bit instruction set architecture (ISA) promulgated by Intel Corporation of Santa Clara, Calif., known as the IA-32 architecture. In this embodiment, an assembly language instruction known as WRMSR is invoked by the driver to write data comprising the cache allocation information to the MSR. Similarly, the driver instructs the graphics engine to begin or cease accessing a particular portion of the cache memory when appropriate. In this way, it is the driver's responsibility to ensure the functionality of the system as the hardware does not guarantee cache coherency in the L2 cache between data stored by the graphics engine and data stored by the processor core.

Figure 2A:
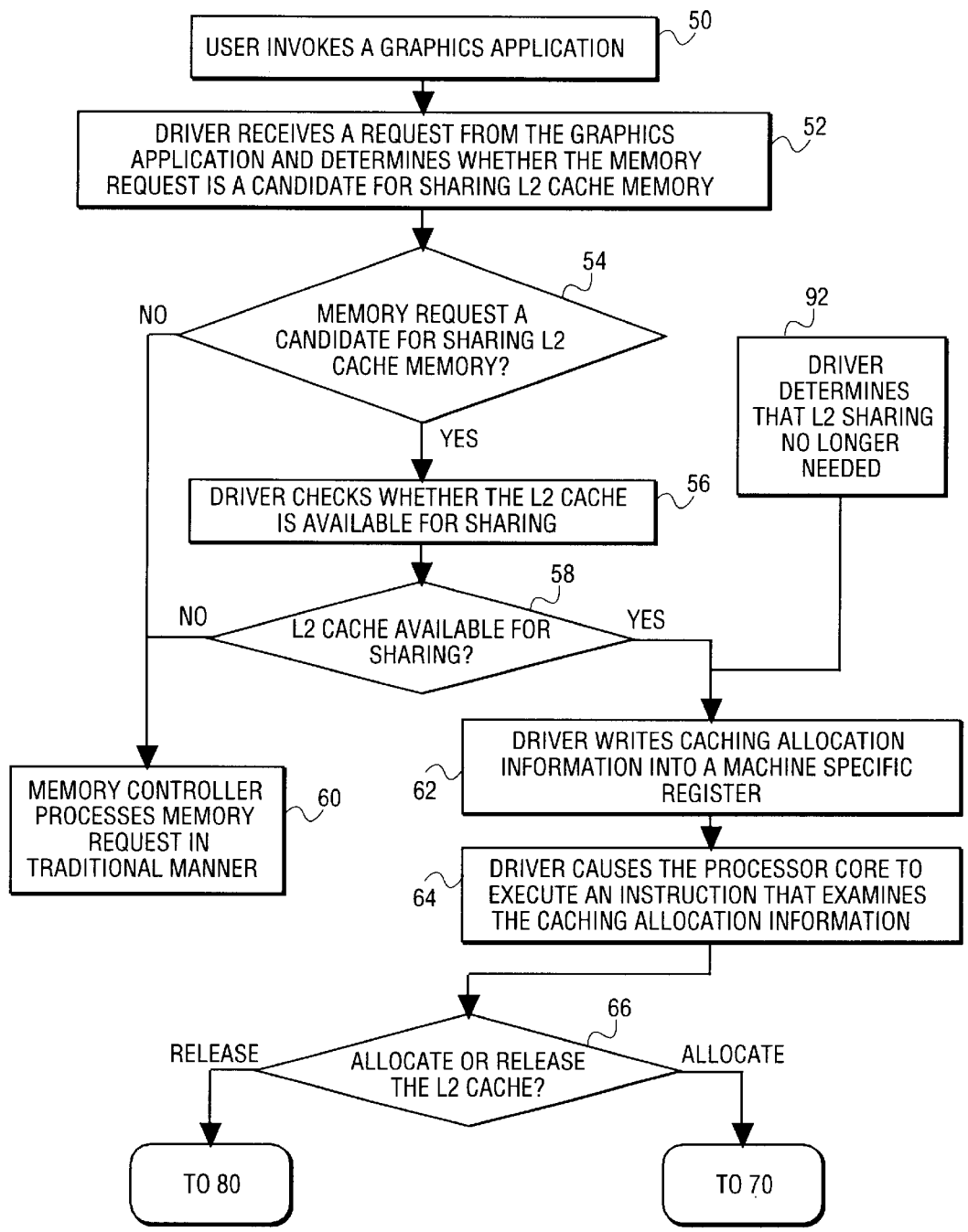
FIGS. 2A and 2B illustrate a flow of actions taken in a microprocessor according to an embodiment of a system and method for sharing a cache memory.
Figure 2B:
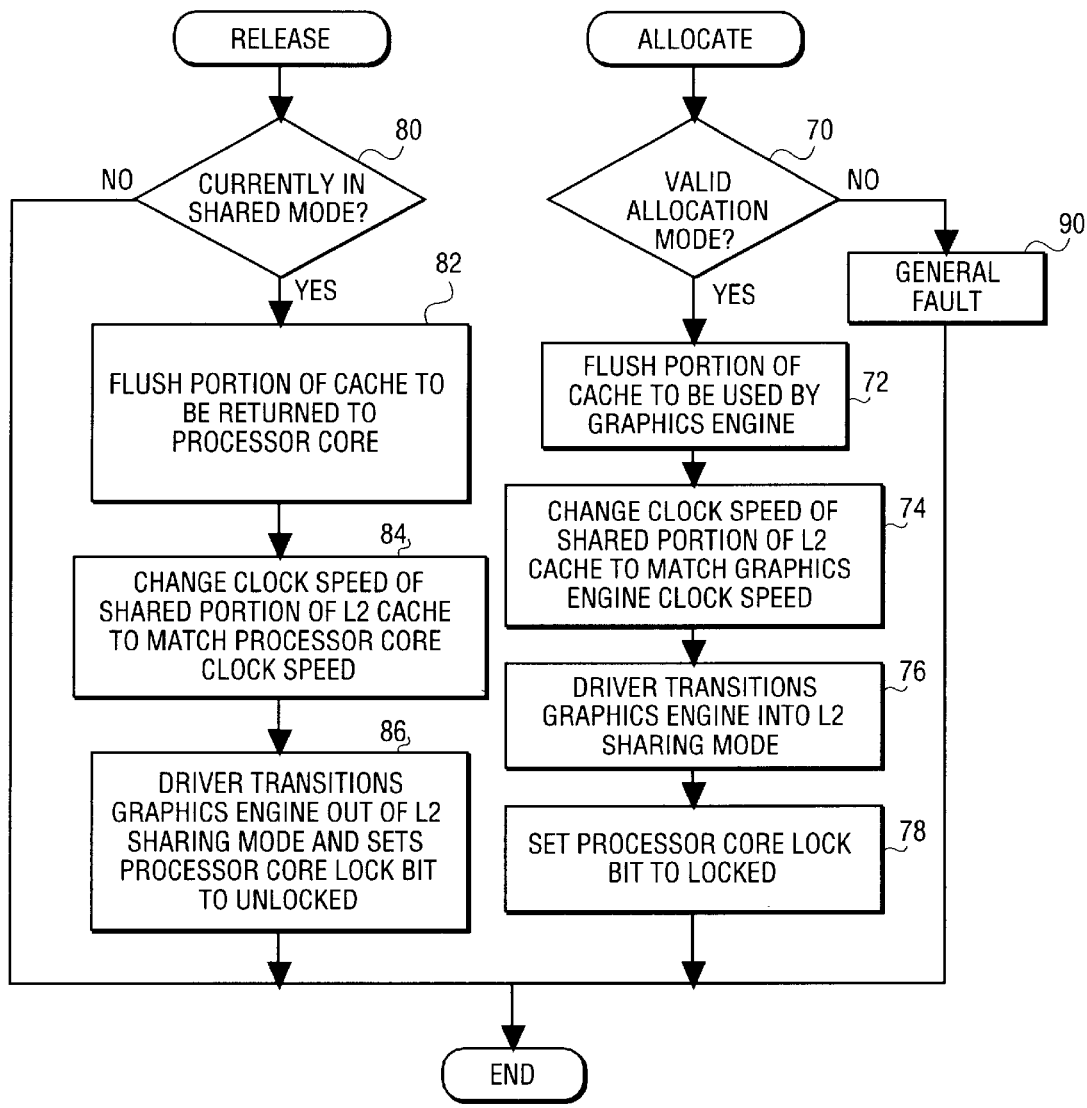

FIGS. 2A and 2B illustrate a flow of actions taken in a microprocessor according to an embodiment of a system and method for sharing a cache memory. Upon boot up of a device in which a processor incorporating the teachings of the present invention is installed, an L2 cache is allocated to the processor core. When graphics processing begins, graphics rendering tasks are assigned to the graphics engine according to well known methods. When processing graphics, the graphics engine may access its own cache memory as well as main memory.

Referring now to FIG. 2A, when a user invokes a graphics intensive application program, as shown in block 50, the driver receives a request from the graphics application and determines whether the memory request is a candidate for sharing the L2 cache memory currently exclusively allocated to the processor core, as shown in block 52. To determine whether the memory request initiated by the graphics application is a candidate for L2 cache sharing, the driver determines whether the graphics engine is performing processing activity of a kind that will benefit from sharing a portion of high-speed L2 cache. In one embodiment, the driver analyzes the screen size in pixels of the particular device in which the processor is incorporated. That is, the screen size in pixels of a display device involved in the memory requests that the driver is receiving is analyzed. A check is then made to determine whether the memory request is a candidate for sharing the L2 cache memory, as shown in block 54. If the memory request indicates that the graphics application will not benefit from sharing the L2 cache, as shown in block 54, the driver directs the memory request to the memory controller, and the memory controller processes the memory request in the traditional manner, as shown in block 60.

If the memory request is of a kind that indicates that the graphics engine will benefit from sharing the L2 cache, the driver determines whether the L2 cache is available for sharing, as shown in block 56. That is, the driver may consider the current load on the processor core or current memory demands of the processor core and determine whether it will be more beneficial to keep the L2 cache fully allocated to the processor. If the L2 cache is not available for sharing, as shown in block 58, the memory controller processes the memory request in the traditional manner, as shown in block 60.

If the driver determines that the L2 cache is available for sharing, the driver writes cache allocation information into a machine specific register (MSR), as shown in block 62. In one embodiment, the cache allocation information includes an allocation action bit and allocation mode data. In one embodiment, this is achieved by the WRMSR instruction discussed above. The driver then causes the processor to execute an instruction that examines the cache allocation information, as shown in block 64. In one embodiment, before the instruction is executed, the driver ensures that there are no currently pending instructions in the graphics engine and that no additional graphics engine instructions are sent to the graphics engine for execution. In one embodiment, this may be achieved by emptying any instruction or execution queues in the graphics engine. A check is then made to determine whether the allocation action bit in the cache allocation information in the MSR directs the driver to allocate a portion of the L2 cache to or release a portion of the L2 cache from the graphics engine, as shown in block 66.

Referring now to FIG. 2B, if the allocation action bit in the MSR is set to allocate, a check is then made to determine whether the allocation mode specified in the cache allocation information is valid, as shown in block 70. If the allocation mode is not valid, the processor issues a general fault, as shown in block 90. If the allocation mode is valid, flow continues at block 72.

In one embodiment, allocation mode data may be defined as a series of 4 bits. In one embodiment, the allocation action bit may be a first bit, bit 0, in the MSR, while the allocation mode may be the next four bits, bits 1 through 4. In another embodiment, the MSR may be 32 bits wide such that the allocation action bit may be bit 31, and the caching allocation mode may be expressed in bits 30 through 27. In one embodiment, four modes may be expressed by the allocation mode data. In a non-shared mode, the entire L2 cache is allocated to the processor core. In a shared-low mode, a small portion of the L2 cache may be allocated to the graphics engine, and the remainder may be allocated to the processor core. In a shared-mid mode, one quarter of the L2 cache may be allocated to the graphics engine while three-quarters of the L2 cache may be allocated to the processor core. In shared-high mode, half of the L2 cache may be split equally between the processor core and the graphics engine. In one embodiment, the allocation mode data bits may be set to define how a 512 Kbyte L2 cache is allocated and shared, as shown in Table A.

TABLE A

| Allocation Mode Description | Allocation Mode Data Bits 30:27 | Processor Core | Graphics Engine |
| --- | --- | --- | --- |
| Non-Shared | 0000 | 512K | 0K |
| Shared-Low | 0011 | 448K | 64K |
| Shared-Mid | 0010 | 384K | 128K |
| Shared-High | 0001 | 256K | 256K |

In some embodiments, the graphics engine may include a texture processing unit and a color and depth (C/Z or Color/Z) processing unit. In this embodiment, allocation of portions of the L2 cache may be made to either or both of these processing units. For example, in one embodiment, the driver may allocate the L2 cache according to four modes. In one mode, a non-shared mode, the entire L2 cache is allocated to the processor core. In an equally shared mode, the driver may allocate the L2 cache such that the processor core may access half of the L2 cache and the color/depth processing unit and the texture processing each access an equal portion of the L2 cache, namely, a quarter of the L2 cache is allocated to each processing unit. In a third mode, the C/Z only shard mode, one quarter of the L2 cache is allocated to the color/depth processing unit of the graphics engine while three quarters of the L2 cache is allocated to the processor core. In a fourth mode, the texture only shared mode, one quarter of the L2 cache is allocated to the texture processing unit of the graphics engine while three quarters of the L2 cache is allocated to the processor core. An example of this embodiment in which an L2 cache of 256 Kbytes may be shared among the processor core, the color/depth processing unit and the texture processing unit is shown in Table B.

TABLE B

| Allocation Mode Description | Allocation Mode Bits 30:27 | Processor Core | Color/Depth (C/Z) | Texture |
| --- | --- | --- | --- | --- |
| Non-Shared | 0000 | 256K | 0K | 0K |
| Equally Shared | 0011 | 128K | 64K | 64K |
| C/Z Only Shared | 0010 | 192K | 0K | 64K |
| Texture Only Shared | 0001 | 192K | 64K | 0K |

There are also various other similar embodiments. For example, yet another embodiment may combine the embodiments or vary the embodiments depicted in Table A and Table B such that an texture only shared low and texture only shared high modes may be included in the driver's possible allocations. In these modes, one quarter and one-half of the L2 cache may be allocated to the texture processing unit and the remainder of the L2 cache may be allocated to the processor core.

The examples discussed in the prior three paragraphs are just that, examples. The system and method of the present invention may be practiced with various other percentages, fractions, portions, etc. of an L2 cache. That is, the invention is not limited to allocation according to the fractions discussed in the prior paragraphs; the invention may be practiced with allocation according to pre-set allocation amounts or allocation of multiples of allocation units that are optimum for a particular cache memory system. Similarly, the system and method of the present invention may be practiced with various other sizes of L2 caches, such as 1 Mbyte, 1.5 Mbytes, 4 Mbytes, etc.

Referring again to FIG. 2B, if the allocation mode is valid, flow continues at block 72 in which the portion of the L2 cache to be used by the graphics engine is flushed. That is, all data currently in use by the processor core in that portion of the L2 cache that is being deallocated from the processor core and is being allocated to the graphics engine is transferred to other memory storage locations, such as, for example, main memory. In some embodiments, the portion of the L2 cache memory to be used by the graphics engine may be cleared at this time. In one embodiment, the clock speed of that portion of the L2 cache that is being assigned to the processor engine is changed to match the clock speed of the graphics engine, as shown in block 74. The driver then transitions the graphics engine into L2 sharing mode, as shown in block 76. That is, the driver instructs the graphics engine to begin accessing the portion of the L2 cache memory allocated to it according to the allocation mode data in the MSR. The graphics engine may set an internal or external bit, register, or other memory location so that it knows to use the L2 cache allocated to it. The driver then executes an instruction which sets the processor core lock bit to locked, as shown in block 78. By setting this bit, the processor knows not to attempt to access the portion of the L2 cache that is being allocated to the graphics engine. In one embodiment, the lock bit may be included as an additional bit in the MSR. In another embodiment, the lock bit may a bit located in another register associated with the processor core that includes various bits. In yet another embodiment, the bit may be a stand alone bit at a location known to the processor.

Referring again to FIG. 2A, at some point, the driver determines that L2 sharing is no longer needed, as shown in block 92. That is, the driver determines that the graphics engine and/or the graphics application no longer needs or will no longer benefit from sharing the L2 cache, or that the processor core needs the L2 cache memory. As above, the driver then writes allocation information in a machine specific register and provides an instruction to the processor which causes the processor to execute an instruction that examines the cache allocation information, as shown in blocks 62 and 64. However, in this situation, the driver instructs the processor to write cache allocation information that includes the allocation action bit set to "release" to the MSR. When a check is made to determine whether to allocate the L2 cache to or release the L2 cache from the graphics engine, as shown in block 66, the processor finds the allocation action bit of the cache allocation information set to "release." Referring again to FIG. 2B, the driver then checks that the L2 cache is currently in shared mode, as shown in block 80. If the L2 cache is in shared mode, the portion of the cache to be returned to the processor core is flushed, as shown in block 82. This ensures that any changes made to data in the L2 cache being used by the graphics engine are not lost and are stored to either the cache memory, the main memory, and/or to disk. The clock speed of the shared portion of the L2 cache is then changed to match the clock speed of the processor core, as shown in block 84. The driver then transitions the graphics engine out of L2 sharing mode and sets the processor core lock bit to unlocked, as shown in block 86. This causes the processor core to begin accessing the entire L2 cache.

In one embodiment, the L2 cache memory may include a state array to maintain the state of the memory locations in the L2 cache. In this embodiment, the state of memory locations may be either modified, exclusive or invalid. When the state is set to modified, the corresponding memory location contains modified data that has not yet been written to another, sometimes more permanent, memory location such as the graphics cache memory, the main memory, and/or a disk memory. When the state is set to exclusive, the memory location reflects the same data as stored in main memory. When the state is set to invalid, the data in the corresponding memory location cannot be trusted as being accurate.

In one embodiment, when the L2 cache transitions from shared mode to being exclusively accessible by the processor core, a hardware mechanism in the L2 cache changes the state of each of the L2 cache memory locations to be returned to the processor core to invalid. In this way, the processor core will see that the L2 cache memory locations that were released from the graphics engine contain bad or inaccurate data, and the processor core will not attempt to read data from any of these memory locations. This will prevent the processor core from wrongly reading data from a memory location in the L2 cache that had been modified by the graphics engine which, therefore, does not correspond to the data expected by the processor core. In addition, in the flush described regarding block 82, the state of all memory locations in the L2 cache that will be released to the processor core may be set to invalid after they have been flushed.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A microprocessor comprising:
   a processor core coupled to a cache memory;
   a graphics engine coupled to the cache memory;
   a driver to selectively control sharing of the cache memory by the processor core and the graphics engine including determining whether the graphics engine is performing processing which would benefit by use of the cache memory.

2. The microprocessor of claim 1 further comprising:
   a memory controller to control access of a main memory by the processor core and the graphics engine.

3. The microprocessor of claim 1 wherein the driver is configured to allocate a first portion of the cache memory to be used solely by the processor core and a second portion of the cache memory to be used solely by the graphics engine as needed.

4. The microprocessor of claim 3 wherein the driver is configured to deallocate the second portion of the cache memory from the graphics engine and reallocate the second portion of the cache memory to the processor core.

5. The microprocessor of claim 1 wherein the cache memory is configured to operate at a first speed to match a processor core speed and at a second speed to match a graphics engine speed.

6. The microprocessor of claim 1 wherein the graphics engine comprises a texture processing unit and a color/depth processing unit.

7. The microprocessor of claim 6 wherein the cache memory is shared among the processor core, the texture processing unit and the color/depth processing unit.

8. The microprocessor of claim 7 wherein the texture processing unit and the color/depth processing unit are each coupled to the cache memory via a specialized bus.

9. The microprocessor of claim 7 wherein the driver is configured to determine when the processor core, the texture processing unit, and the color/depth processing unit will share the cache memory.

10. The microprocessor of claim 7 wherein the driver is configured to determine in what proportions to allocate the cache memory among the processor core, the texture processing unit, and the color/depth processing unit.

11. The microprocessor of claim 7 wherein the driver is further configured to deallocate the cache memory from the texture processing unit and the color/depth processing unit.

12. The microprocessor of claim 7 wherein the driver is further configured to reallocate the cache memory among the processor core, the texture processing unit and the color/depth processing unit.

13. A method comprising:
    receiving a memory request from a graphics application program;
    determining whether a cache memory that may be shared between a processor core and a graphics engine is available to be shared and whether processing performed by the graphics engine would benefit by use of the cache memory;
    allocating a first portion of the cache memory to the processor core and a second portion of the cache memory to the graphics engine if the cache memory is available to be shared and processing performed by the graphics engine would benefit by use of the cache memory.

14. The method of claim 13 wherein allocating comprises:
    notifying the processor core that the second portion of the cache memory may no longer be used if the cache memory is available to be shared.

15. The method of claim 13 wherein allocating comprises:
    notifying the graphics engine that the second portion of the cache memory is available such that the graphics engine may access the second portion of the cache memory directly.

16. The method of claim 13 wherein allocating is achieved by causing an allocation information to be written to a specialized memory location.

17. The method of claim 16 wherein:
    the allocation information comprises a mode data and an allocation action bit; and
    the specialized memory location is a machine specific register.

18. The method of claim 17 wherein the mode data specifies a size of the first portion and a size of the second portion.

19. The method of claim 17 wherein the mode data specifies an allocation of the cache memory among the processor, a color and depth processing unit of the graphics engine, and a texture processing unit of the graphics engine.

20. A computing device comprising a machine readable medium and a processor, the machine readable medium including instructions which when executed by the processor cause the processor to perform operations comprising:

receiving a memory request from a graphics application program;

determining whether a cache memory that may be shared between a processor core and a graphics engine is available to be shared and whether processing performed by the graphics engine would benefit by use of the cache memory;

allocating a first portion of the cache memory to the processor core and a second portion of the cache memory to the graphics engine if the cache memory is available to be shared and processing performed by the graphics engine would benefit by use of the cache memory.

21. The computing device of claim 20 wherein allocating comprises:

notifying the processor core that the second portion of the cache memory may no longer be used if the cache memory is available to be shared.

22. The computing device of claim 20 wherein allocating comprises:

notifying the graphics engine that the second portion of the cache memory is available such that the graphics engine may access the second portion of the cache memory directly if the cache memory is available to be shared.

23. The computing device of claim 20 wherein allocating is achieved by causing an allocation information to be written to a specialized memory location.

24. The computing device of claim 23 wherein:

the allocation information comprises a mode data and an allocation action bit; and the specialized memory location is a machine specific register.

25. The computing device of claim 24 wherein the mode data specifies an allocation of the cache memory among the processor, a color and depth processing unit of the graphics engine, and a texture processing unit of the graphics engine.

* * * * *